United States Patent
Imming et al.

(10) Patent No.: US 7,330,478 B2
(45) Date of Patent: Feb. 12, 2008

(54) METHOD, APPARATUS, AND COMPUTER PROGRAM PRODUCT FOR IMPLEMENTING POINTER AND STAKE MODEL FOR FRAME ALTERATION CODE IN A NETWORK PROCESSOR

(75) Inventors: Kerry Christopher Imming, Rochester, MN (US); John David Irish, Rochester, MN (US); Joseph Franklin Logan, Apex, NC (US); Tolga Ozguner, Rochester, MN (US); Michael Steven Siegel, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 906 days.

(21) Appl. No.: 10/667,024

(22) Filed: Sep. 18, 2003

(65) Prior Publication Data

US 2005/0063415 A1     Mar. 24, 2005

(51) Int. Cl.
   *H04L 12/56*     (2006.01)
   *G06F 15/16*     (2006.01)

(52) U.S. Cl. ........................ 370/412; 709/217
(58) Field of Classification Search ............... 370/389, 370/395.1, 395.7, 412
See application file for complete search history.

(56) References Cited

U.S. PATENT DOCUMENTS

| | | | | | |
|---|---|---|---|---|---|
| 5,353,283 | A | * | 10/1994 | Tsuchiya | 370/392 |
| 5,651,002 | A | * | 7/1997 | Van Seters et al. | 370/392 |
| 5,832,310 | A | * | 11/1998 | Morrissey et al. | 710/71 |
| 6,091,707 | A | * | 7/2000 | Egbert et al. | 370/229 |
| 6,098,110 | A | * | 8/2000 | Witkowski et al. | 709/249 |
| 6,172,990 | B1 | * | 1/2001 | Deb et al. | 370/474 |
| 6,356,951 | B1 | * | 3/2002 | Gentry, Jr. | 709/250 |
| 2005/0060418 | A1 | * | 3/2005 | Sorokopud | 709/230 |

* cited by examiner

*Primary Examiner*—Kwang Bin Yao
*Assistant Examiner*—Vaibhav (Manu) Sawhney
(74) *Attorney, Agent, or Firm*—Joan Pennington

(57) ABSTRACT

A method, apparatus and computer program product are provided for implementing a pointer and stake model for frame alteration code in a network processor. A current pointer and a stake are provided for a packet selected for transmit. The current pointer is maintained for tracking a current position for frame alteration operations in the packet. The stake is maintained for tracking a start of a current header for frame alteration operations in the packet. The current pointer is used by frame alteration code instructions to specify a sequence of operations relative to the current pointer. The specified frame alteration sequence is compact in terms of code size to operate on data within a small window of bytes. Advance pointer instructions allow the current and stake pointers to be advanced an arbitrary number of bytes into the packet.

5 Claims, 4 Drawing Sheets

METHOD, APPARATUS, AND COMPUTER PROGRAM PRODUCT FOR IMPLEMENTING POINTER AND STAKE MODEL FOR FRAME ALTERATION CODE IN A NETWORK PROCESSOR

FIELD OF THE INVENTION

The present invention relates generally to the data processing field, and more particularly, relates to a method, apparatus and computer program product for implementing a pointer and stake model for frame alteration code in a network processor.

DESCRIPTION OF THE RELATED ART

Network processing functions of a network processor must be performed at a high rate to avoid causing any bottleneck in the communications network. A processor and software typically handle frame alteration operations.

U.S. Pat. No. 6,546,021 to Albert Alfonse Slane, issued Apr. 8, 2003 and assigned to the present assignee, discloses a method and apparatus for user programmable packet to connection translation. When a data block is received, a protocol type for the received data block is identified based upon the media connection or port number for the received data block. A connection identification is formed utilizing a header of the received data block, responsive to the identified protocol type for the received data block. An instruction array is used with an arithmetic logic unit (ALU). Different code sequences are loaded into the instruction array based upon the user configured protocol type for a media connection or port number of the received data block.

An efficient model for altering packets within a network processor defers frame alterations until the time that the packet is transmitted. By doing this, a small sequence of commands can be stored with the packet to control alteration instead of having to read the packet data, alter it using the processor, and then storing it back to packet storage for later transmission. This deferred processing saves memory bandwidth and this reduced memory bandwidth reduces the cost of the network processor by minimizing the number of chip pins dedicated to the memory interface. With deferred alteration, a small processing engine operates on the outgoing packet under control of the sequence of frame alteration instructions.

One known network processor performed this type of frame alteration on the pico-engines during packet transmit. The deferred frame alteration sequence enables packet processing for many well-known cases, for example, overlay destination address and decrement time-to-live counter, without any pre-packet processing. Hardware classifies the incoming packet and stores the appropriate frame alteration sequence along with the packet. The sequence can contain conditional processing such that alteration is specific to the particular port out which the packet is transmitted.

A key to the effectiveness of the frame alteration code is how compact it is. That is, how much function can be specified in a small number of alteration sequence bytes.

SUMMARY OF THE INVENTION

A principal object of the present invention is to provide a method, apparatus and computer program product for implementing a pointer and stake model for frame alteration code in a network processor. Other important objects of the present invention are to provide such method, apparatus and computer program product for implementing a pointer and stake model for frame alteration code in a network processor substantially without negative effect and that overcome many of the disadvantages of prior art arrangements.

In brief, a method, apparatus and computer program product are provided for implementing a pointer and stake model for frame alteration code in a network processor. A current pointer and a stake are provided for a packet selected for transmit. The current pointer is maintained for tracking a current position for frame alteration operations in the packet. The stake is maintained for tracking a start of a current header for frame alteration operations in the packet.

In accordance with features of the invention, the current pointer is used by frame alteration code instructions to specify a sequence of operations relative to the current pointer. The specified frame alteration sequence is compact in terms of code size to operate on data within a small window of bytes. Advance pointer instructions allow the current and stake pointers to be advanced an arbitrary number of bytes into the packet. At the end of the specified frame alteration sequence, an advance and set stake instruction is included to advance the current pointer and stake to the start of a next packet header.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

Figure 1:
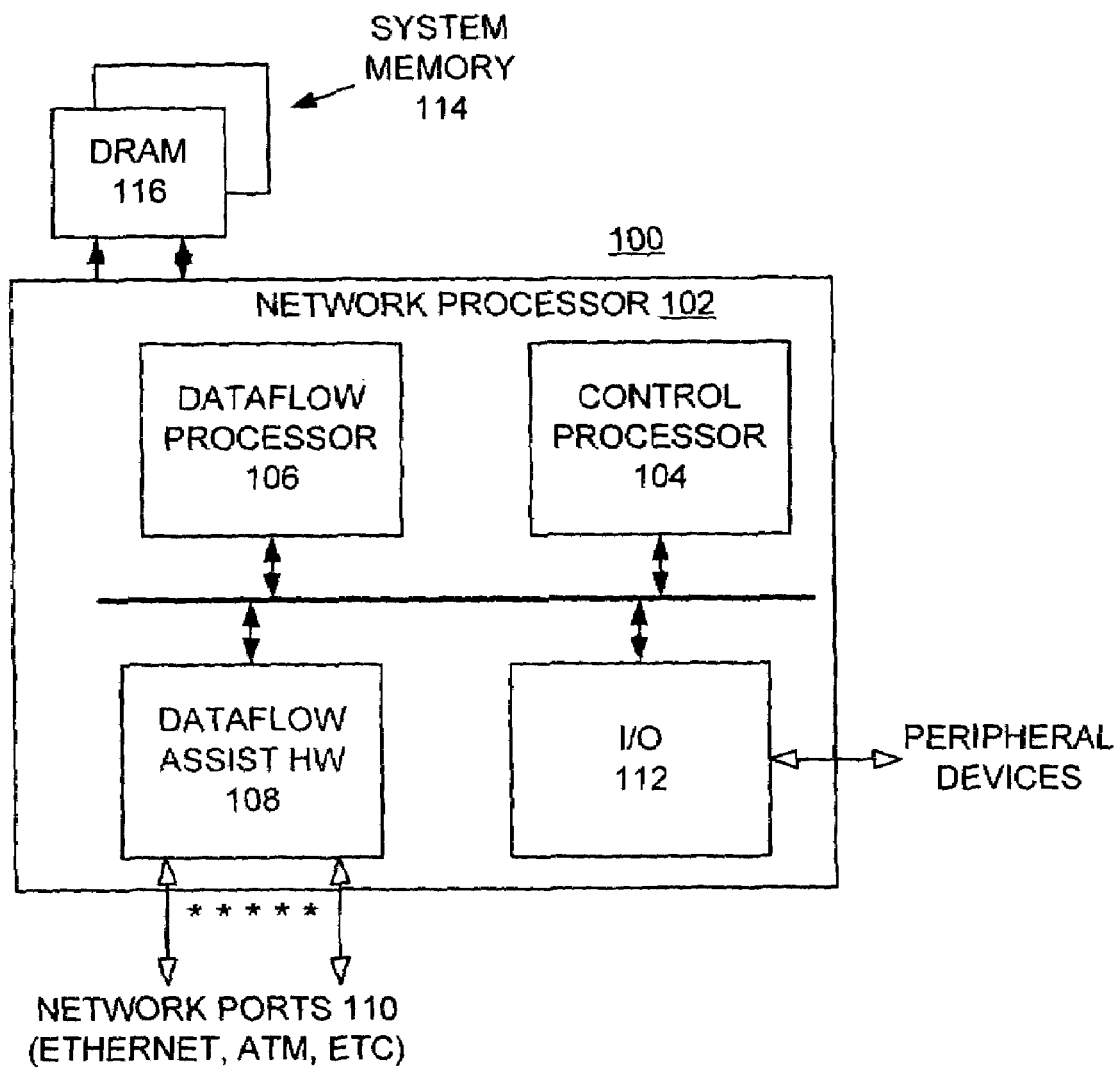
FIG. 1 is a block diagram representation illustrating a network processor system for implementing a pointer and stake model for frame alteration code in accordance with the preferred embodiment.

Having reference now to the drawings, in FIG. 1, there is shown a network processor system generally designated by the reference character 100 for carrying out methods for implementing a pointer and stake model for frame alteration code of the preferred embodiment. As shown in FIG. 1, network processor system 100 includes a network processor 102. Network processor system 100 includes a control processor 104, and a dataflow processor 106 coupled by a network processor bus to dataflow assist hardware (HW) 108 of the preferred embodiment. The dataflow assist hardware (HW) 108 of the preferred embodiment is coupled to multiple network ports #1-N, 110 for communicating using various ones of known network protocols, such as, an Asynchronous Transfer Mode (ATM), Ethernet, and the like. In accordance with features of the preferred embodiment, a single or multiple different protocols can be used at each of the network ports #1-N, 110. Network processor system 100 includes an input/output (I/O) 112 coupled to peripheral devices. Network processor system 100 includes a system memory 114 including a dynamic random access memory (DRAM) 116.

In accordance with features of the preferred embodiment, problems of encoding efficiency and code layering are solved for processing multiple layers of protocol in a network processor by an execution model and resulting instruction encoding that provides a compact instruction sequence size. Network processing is a sequential or streaming model, where processing is done very close to the order in which bytes are transmitted. This invention leverages that ordering to minimize the size, in bytes, of frame alteration code. A model and supporting hardware of the preferred embodiment implements a current pointer and a stake as illustrated and described with respect to FIGS. 2-5.

Figure 2:
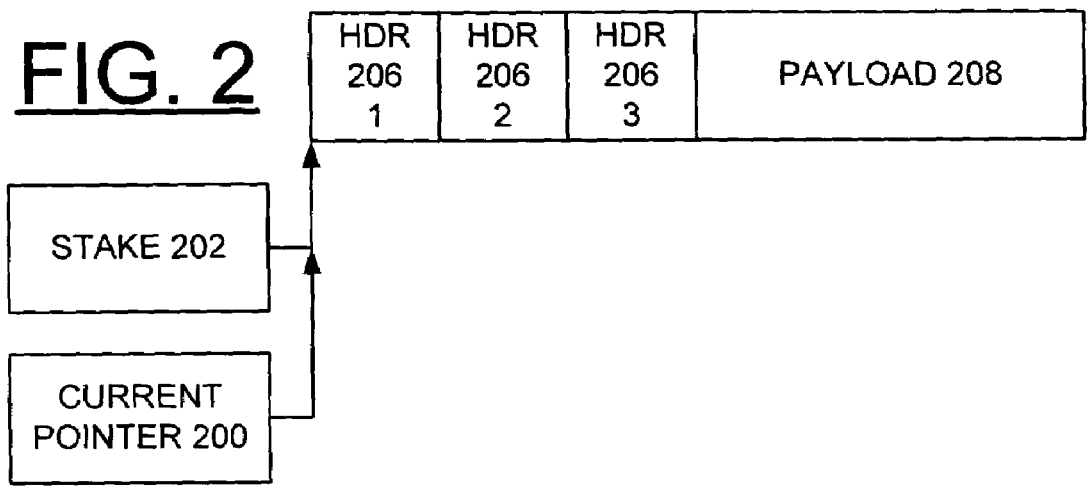
FIGS. 2, 3, and 4 are diagrams illustrating the pointer and stake model in accordance with the preferred embodiment.
Figure 3:
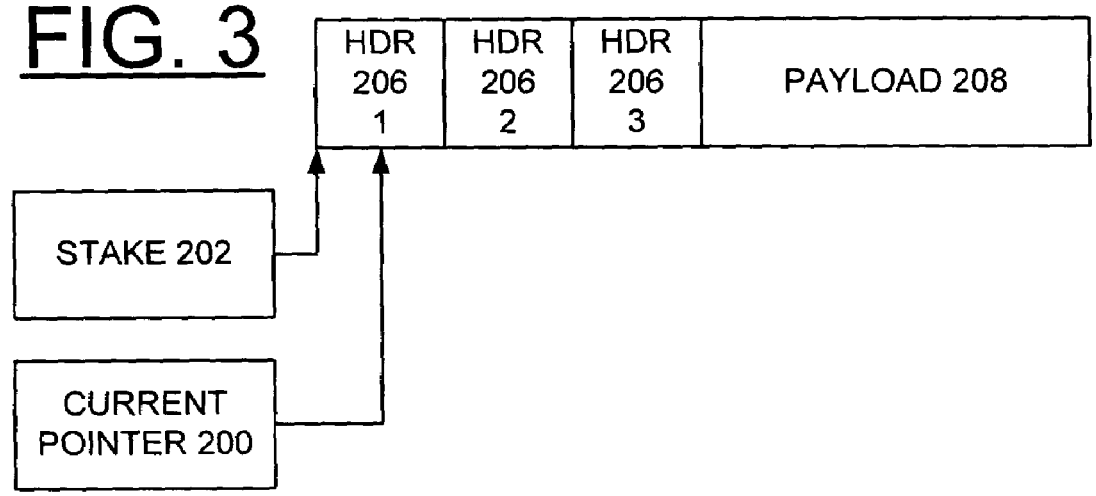
Figure 4:
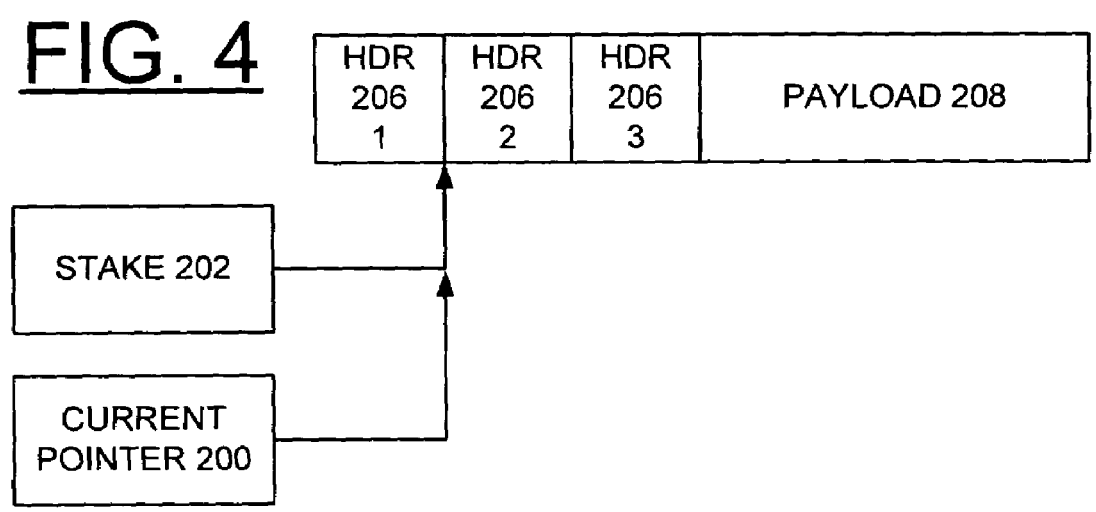

Referring now to FIGS. 2-4, in accordance with features of the preferred embodiment, a first pointer or a current pointer 200, is provided to the current processing point in the packet. Frame alteration code instructions specify an offset from this current pointer 200 of up to 15 bytes that is encoded as a 4-bit value, 0 to 15. A second pointer or a stake 202, is also provided which points to a beginning of a packet header.

In FIGS. 2-4, the general packet model for this instruction set is illustrated where a packet 204 includes one or more headers 206 followed by a packet payload 208.

The value of stake 202 is used for instructions that need to know when a given header starts for operation like generating header checksums or decrementing the time-to-live field in an IPV4 header.

Instructions are provided that advance the current pointer 200 and optionally set the stake value 202 to the new pointer. These advance instructions allow the frame alteration sequence to advance arbitrarily far into the packet data while the efficient offset encoding allows for compact code for the more common case of small headers.

Using these current and stake pointers 200, 202 and this execution model, along with the software convention that code sequences start at offset 0 and by advancing current pointer 200 to the start of the next header, frame alteration code advantageously is combined to process one or multiple packet headers for multiple protocol layers. The frame alteration code for each layer is independent and only needs to be aware of the header length for its own layer.

Using these pointers 200, 202, a frame alteration sequence is specified that is compact in terms of code size when operating on data within a small window of bytes defined by an offset from the current pointer 200. Flexibility is provided via the advance pointer instructions that allow these pointers 200, 202 to be advanced an arbitrary number of bytes into the packet 204.

In the pointer and stake processing model, the current pointer 200 is maintained that tracks the position of the current operations on the packet. The stake 202 is also maintained that tracks the beginning of the current header 206. These pointers 200, 202 are under software control.

As shown in FIG. 2, when a new packet 204 is selected for transmit, hardware 108 resets current pointer 200 and the stake 202 to the start of the packet.

As shown in FIG. 3, a sequence of operations is specified relative to current pointer 200. As the frame alteration sequence for the first header 206, 1 is performed the current pointer 200 is provided to the current processing point in the packet 204.

At the end of the sequence for the first header, an advance and set stake instruction is included which advances current pointer 200 to the start of the next header 206, 2 and sets that point as the new stake 202.

As shown in FIG. 4, the alteration sequence starts with current pointer 200 pointing to the start of header 206, 2.

Figure 5:
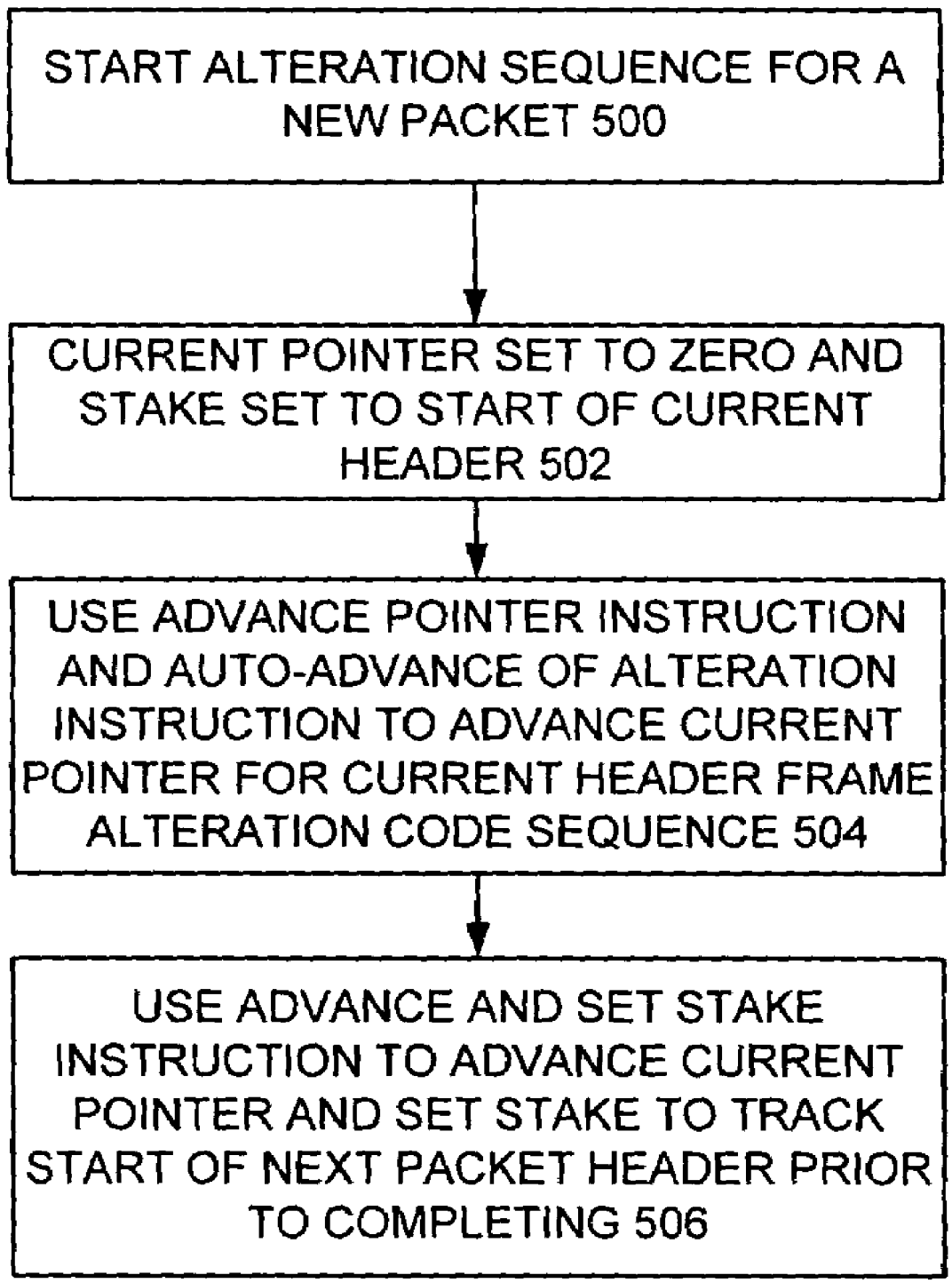
FIG. 5 is a diagram illustrating exemplary steps for implementing the pointer and stake model for frame alteration code in accordance with the preferred embodiment.

Referring to FIG. 5, there are shown exemplary steps for implementing the pointer and stake model for frame alteration code in accordance with the preferred embodiment. An alteration sequence for a new packet is started as indicated in a block 500.

As indicated in a block 502, at the start of processing for a new packet 204, the current pointer 200 is set to zero and the stake 202 is set to the start of the current header. The current pointer 200 is a base for a window of bytes in the packet stream that can be operated on by the frame alteration code. A field in operate instructions is used that specifies a small offset from current pointer 200. The stake value 202 tracks the first byte in a packet header 204.

As indicated in a block 504, software advances this current pointer 200 using an advance pointer instruction, for example, to reach data further into the packet 204 and an auto-advance feature of some frame alteration instructions, such as an overlay frame alteration instruction, also is used to automatically advance the current pointer 200. The auto-advance feature in some instructions automatically advances current pointer 200 and saves extra instructions that would be required to advance the current pointer separately.

As indicated in a block 506, an advance and set stake instruction is used by software to advance the current pointer 200 and the stake 202 to the start of a next packet header prior to completing.

Advantages provided by the current pointer 200 and stake 202 of the preferred embodiment include code efficiency enabled by the code compression enabled by the current pointer 200. Use of the current pointer 200 allows for reduction of the offset for the individual instructions to four bits with advance instructions used to move current pointer 200 further into a packet 204. An auto advance feature of some instructions is used to automatically advance the current pointer 200 and eliminates extra instructions otherwise required to advance the pointer separately.

Figure 6:
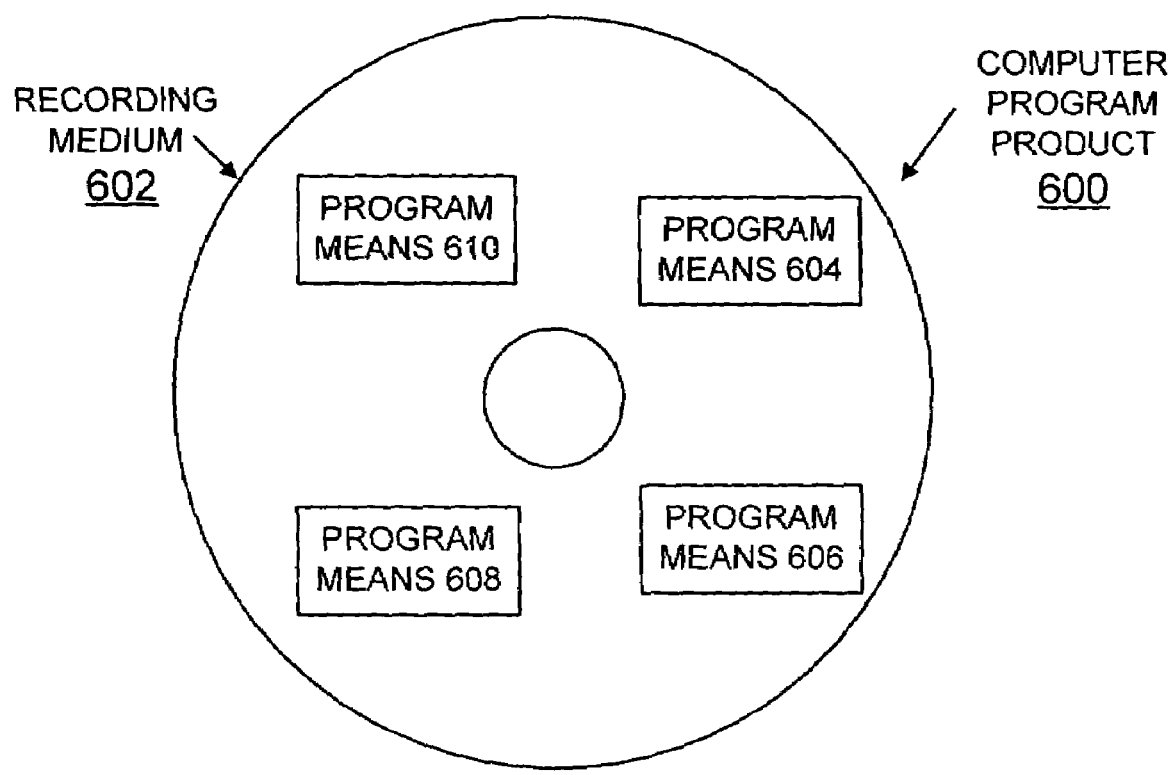
FIG. 6 is a block diagram illustrating a computer program product in accordance with the preferred embodiment.

Referring now to FIG. 6, an article of manufacture or a computer program product 600 of the invention is illustrated. The computer program product 600 includes a recording medium 602, such as, a floppy disk, a high capacity read only memory in the form of an optically read compact disk or CD-ROM, a tape, a transmission type media such as a digital or analog communications link, or a similar computer program product. Recording medium 602 stores program means 604, 606, 608, 610 on the medium 602 for carrying out the methods for implementing a current pointer and stake model for frame alteration code of the preferred embodiment in the network processor system 100 of FIG. 1.

A sequence of program instructions or a logical assembly of one or more interrelated modules defined by the recorded program means 604, 606, 608, 610, direct the network processor system 100 for implementing the current pointer 200 and stake 202 for frame alteration code of the preferred embodiment.

While the present invention has been described with reference to the details of the embodiments of the invention shown in the drawing, these details are not intended to limit the scope of the invention as claimed in the appended claims.

What is claimed is:

1. A method for implementing a pointer and stake model for frame alteration code in a network processor comprising the steps of:

providing a current pointer and a stake for a packet selected for transmit;

maintaining said current pointer for tracking a current position for frame alteration operations in the packet;

maintaining said stake for tracking a start of a current header for frame alteration operations in the packet; and providing an advance and set stake instruction at the end of a specified frame alteration sequence to advance said current pointer and said stake to the start of a next packet header.

2. A method for implementing a pointer and stake model for frame alteration code as recited in claim 1 includes the steps of utilizing hardware to set said current pointer and said stake to a start of a new packet selected for transmit.

3. Apparatus for implementing a pointer and stake model for frame alteration code in a network processor comprising:

a current pointer maintained for tracking a current position for frame alteration operations in the packet;

a stake maintained for tracking a start of a current header for frame alteration operations in the packet;

said current pointer and said stake being set to a start of a packet selected for transmit;

advance pointer instructions for allowing said current pointer and said stake to be advanced an arbitrary number of bytes into the packet; and an advance and set stake instruction for advancing said current pointer and said stake to a start of a next packet header.

4. A computer-readable medium encoded with a computer program product for implementing a pointer and stake model for frame alteration code in a network processor system, said computer program product including a plurality of computer executable instructions stored on said computer-readable medium, wherein said instructions, when executed by the network processor system, cause the network processor system to perform the steps of:

providing a current pointer and a stake for a packet selected for transmit;

maintaining said current pointer for tracking a current position for frame alteration operations in the packet;

maintaining said stake for tracking a start of a current header for frame alteration operations in the packet; and providing an advance and set stake instruction at the end of a specified frame alteration sequence to advance said current pointer and said stake to the start of a next packet header.

5. A computer-readable medium encoded with a computer program product for implementing a pointer and stake model for frame alteration code as recited in claim 4 includes the steps of utilizing hardware to set said current pointer and said stake to a start of a new packet selected for transmit.

* * * * *